United States Patent [19]
Sekine et al.

[11] Patent Number: 5,189,513
[45] Date of Patent: Feb. 23, 1993

[54] IMAGE PROCESSING DEVICE

[75] Inventors: Masayoshi Sekine, Tokyo; Toshiaki Kondo, Atsugi, both of Japan

[73] Assignee: Canon Kabushiki Kaisha, Tokyo, Japan

[21] Appl. No.: 896,783

[22] Filed: Jun. 9, 1992

Related U.S. Application Data

[63] Continuation of Ser. No. 811,910, Dec. 23, 1991, abandoned, which is a continuation of Ser. No. 687,633, Apr. 19, 1991, abandoned.

[30] Foreign Application Priority Data

Apr. 27, 1990 [JP] Japan .................. 2-113951

[51] Int. Cl.$^5$ ............... G06F 15/68; G06F 15/70; H04N 5/225
[52] U.S. Cl. ............... 358/105; 358/222; 382/43
[58] Field of Search .............. 358/105, 222; 382/43

[56] References Cited

U.S. PATENT DOCUMENTS
4,959,725 9/1990 Mandle ..................... 358/105

FOREIGN PATENT DOCUMENTS
60-46878 10/1985 Japan .

OTHER PUBLICATIONS
J. Limb & J. Murphy, Measuring the Speed of Moving Objects from Television SIgnals, IEEE Transactions on Communications, vol. COM-23, No. 4, Apr. 1975, p. 474.

Primary Examiner—Howard W. Britton
Attorney, Agent, or Firm—Fitzpatrick, Cella, Harper & Scinto

[57] ABSTRACT

The present invention relates to an image processing device, consisting of filter device which extracts predetermined spatial frequency components from an input image signal, and a binarizing circuit which binarizes the output of the filter device by assessing a zero level as a threshold level, as well as the image vibration correcting device which detects a movement vector of an image by use of the image processing device and thus corrects the image vibration.

31 Claims, 6 Drawing Sheets

IMAGE PROCESSING DEVICE

This application is a continatuion of application Ser. No. 07/811,910 filed Dec. 23, 1991, now abandoned, which in turn is a continuation appliatin of Ser. No. 07/687,633 filed Apr. 19, 1991, now abandoned.

BACKGROUND OF THE INVENTION

1. Field of the Invention

The present invention relates to an image processing device for detecting the movement of an image by measuring the movement vector of the image and, more particularly, the present invention relates to a pretreatment device to recognize the moving images.

2. Related Background Art

In this field, there are already known two methods for detecting the movement vector, namely a gradient method and a matching method. The gradient method is described in Japanese Patent Publication No. 60-46878, and in the article "Measuring the speed of moving objects from Television Signals", IEEE. Trans. Com., Com-23,4 pp.474–478 (April 1975), written by J. O. Limb and J. A. Murphy, etc. The matching method is also explained, for example, in the literature, entitled as "A device for detecting the moving vector for muse application", in the Television Academic Institute's Technical Report PP OE59-5, written by Uichi Ninomiya, etc.

There is a close co-relation between the pattern size of an object shown in the image, namely its space frequency, and the detection accuracy for a movement vector to be detected from the image. For example, when case an image of high spatial frequency, which includes periodic patterns such as stripe pattern, is to be detected, the gradient method tends to narrow the range of its detection while the matching method tends to increase the probability for erroneous detection. When an image of low spatial frequency such as an image showing a plain wall without a pattern is in full picture, both methods cause erroneous detection.

Furthermore, since both detection methods are designed to handle a multivalued density gradation, they have the common problem of equipment with complicated hardware components. On the other hand, the pattern matching of a binary image enables the simplification of the hardware components but it causes its sensor to detect different patterns when under lighting having different values of brightness thus resulting in a drawback that is likely to produce erroneous detection.

SUMMARY OF THE INVENTION

The primary object of the present invention is to solve these problems and provide an image processing device which detects the moving vector more accurately.

The second object of the present invention is to provide an image processing device which catches the binary pattern of the image, while not being affected by the brightness of lighting over the object, as a result of which the device detects the movement vector accurately even if the brightness fluctuates.

The third object of the present invention is to provide an image processing device, which detects precisely detects the movement vector of very fine patterns of the image, and to simplify the hardware components, in comparison with multivalued density gradation system, by embodying a function to recognize the binary pattern.

In order to attain the above-mentioned object, the image processing device of the present invention comprises filter means, which extracts predetermined spatial frequency components from the input image, and a binarizing circuit which binarizes the output of the filter means by assessing its zero level as a threshold level.

The fourth object of the present invention is to provide an image vibration correcting device which detects the movement vector of the image by use of the image processing device, to correct the image vibration according to the detection.

The above-mentioned object can be attained, according to the present invention, by an image vibration correcting device comprising filter means, which extracts predetermined spatial frequency components from an input image; a binarizing circuit, which binarizes the output from the filter means by binary assessing a zero level as a threshold level; detection means, which detects the movement vector utilizing the output from the binarizing circuit; movement correction means, which corrects the movements of image on the basis of the movement vector output from the detection means.

The other objects and characteristics of the present invention shall be made evident in those detailed description and drawings shown below.

DETAILED DESCRIPTION OF THE PREFERRED EMBODIMENTS

The present invention will be explained in detail with reference to the drawings.

Figure 1:
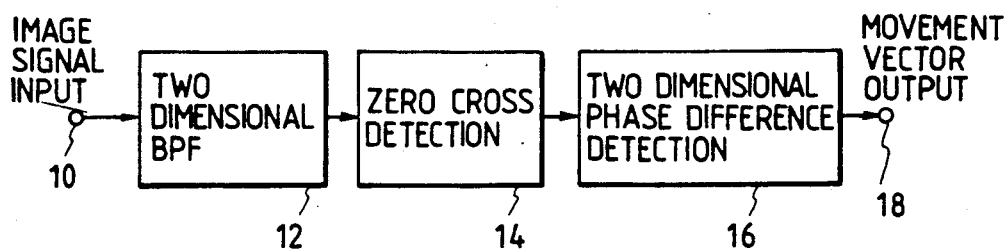
FIG. 1 is a block diagram, showing an embodiments of the present invention.

FIG. 1 is a block diagram showing an embodiment of the present invention. Element 10 is an input terminal for the moving image signal such as television signals, Element 12 is a two-dimensional band pass filter (BPF) realized by a digital filter. Element 14 is a zero cross detection circuit, which functions as a concentration normalizing circuit, and is realized by a binarizing circuit. Element 16 is a two-dimensional phase-difference detection circuit, which measures the phase difference in image patterns between the specified fields. Element 18 is an output terminal for the movement vector detected by the two-dimensional phase-difference detection circuit 16. The input terminal 10, may only be fed the lighting components of video signals such as from a NTSC or PAS system.

Figure 2:
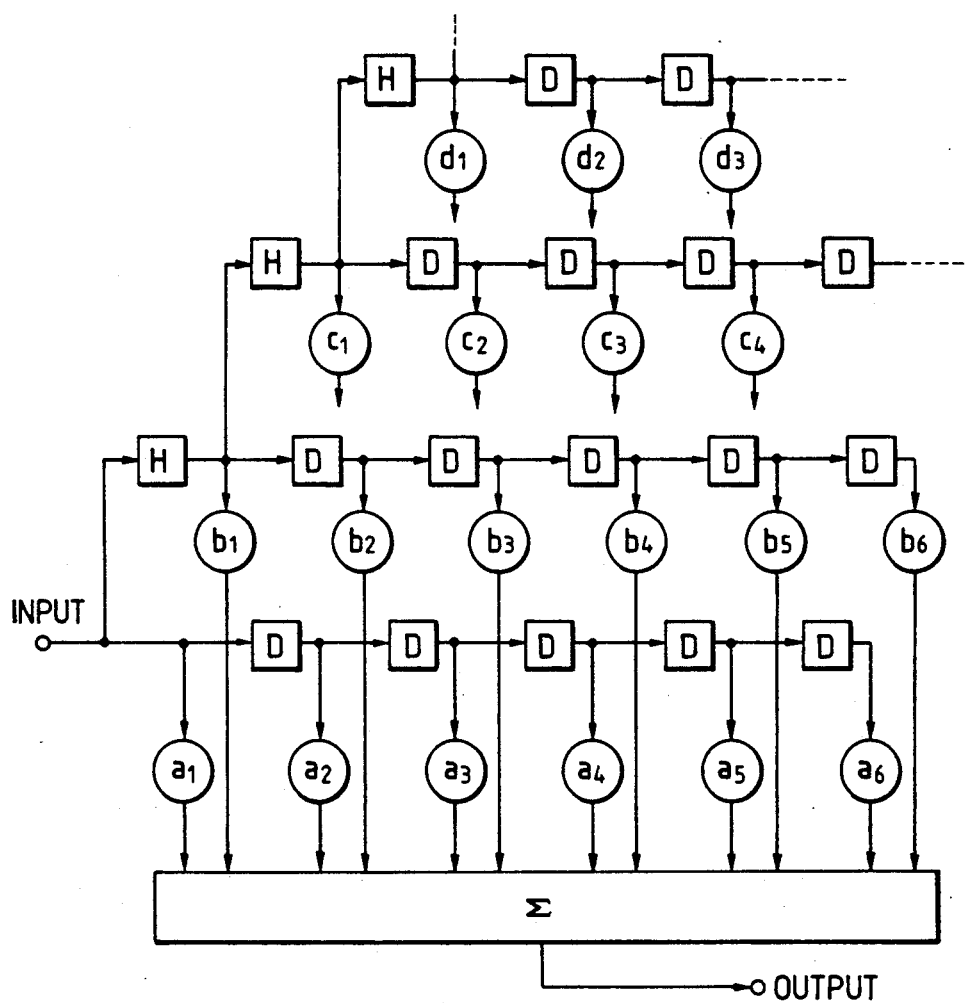
FIG. 2 is an embodiment of a circuit diagram for a two-dimensional BPF 12.

FIG. 2 shows an embodiment of a circuit diagram in which a digital filter circuit is adopted for the two-dimensional BPF 12. In FIG. 2, H means a line memory;

D means a pixel memory, which provides a time lag between the neighboring two pixels; $a_1 \sim a_n$, $b_1 \sim b_n$, $c_1$ . . . means a multiplication circuit of fixed number; $\Sigma$ means the addition circuit. The circuit, shown in FIG. 2, extracts predetermined frequency components by two-dimensional convolution (mask processing).

Figure 3:
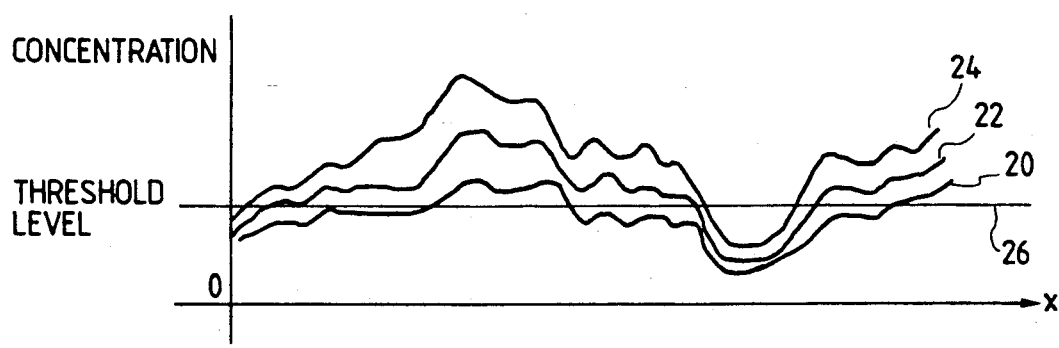
FIG. 3 is a waveform graph for the input of a two-dimensional BPF 12.
Figure 4:
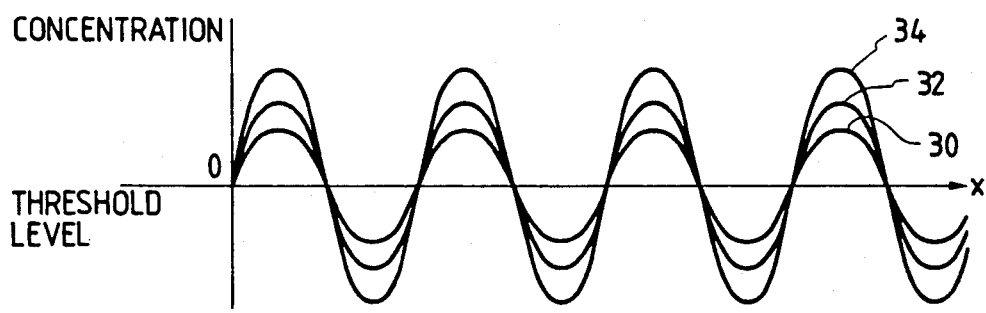
FIG. 4 is a waveform graph for the output of a two-dimensional BPF 12.

FIG. 3 shows the brightness signal, which is to be fed at the input terminal 10, namely the waveform of an input signal of a two-dimensional BPF 12. FIG. 4 shows the output waveforms of the two-dimentional BPF 12. In FIG. 3 and FIG. 4, the horizontal axis means the distance toward X direction while the vertical axis means the concentration, thus the figure illustrates a cross-section located at a two-dimensional space. In FIG. 3, Curves 20, 22 and 24 show the waveforms of brightness signals which are recorded by applying different lighting conditions to an object. In FIG. 4, Curve 30, 32 and 34 show the output waveforms of BPF 12, which correspond to Curves 20, 22 and 24 respectively.

The conventional binarizing method sets a constant threshold level, for example the level indicated as 26, for detecting the brightness signal waveforms, but does not adopt the filter means demonstrated in the present invention. Consequently, the system has a drawback where the binary pattern. changes, being accompanied with the variation of concentration caused by the changes of lighting conditions as shown in Curves 20, 22 and 24. In the embodiment of the present invention, however, a certain and identical frequency component is extracted by the two-dimensional BPF 12 and the image processing device defects the movement vector from the phase information of such identified frequency component. To put it concretely, in Curves 30, 32 and 34, which show BPF 12 output waveforms, the zero cross point (zero point of concentration) remains constant regardless of the lighting conditions. In other words, even if the intensity of brightness changes, the zero cross point of a signal for an identified frequency component does not move. Since the zero cross point moves correspondingly as the object moves, it is possible to detect the movement vector by checking the zero cross point. The zero cross point detection circuit 14 detects the zero cross point of an output signal from the two-dimensional BPF 12, then the zero level is identified as the threshold level and the output of the BPF 12 is binarized.

To prove the findings shown above, the 10-cycle frequency components are extracted from an original image of a two-dimensional BPF 12, the zero point is identified as the threshold point and the BPF 12 output is binarized. In parallel, the brightness is reduced by 5% from the ordinary level and the results thereof are compared. As a result, two identical binary patterns are confirmed. Furthermore, taking into account the random noise (20-40 dB), which is contained in the image, an experiment was conducted by reducing the brightness by about 10% and then it was confirmed that the shape of image pattern showed no changes.

Figure 5:
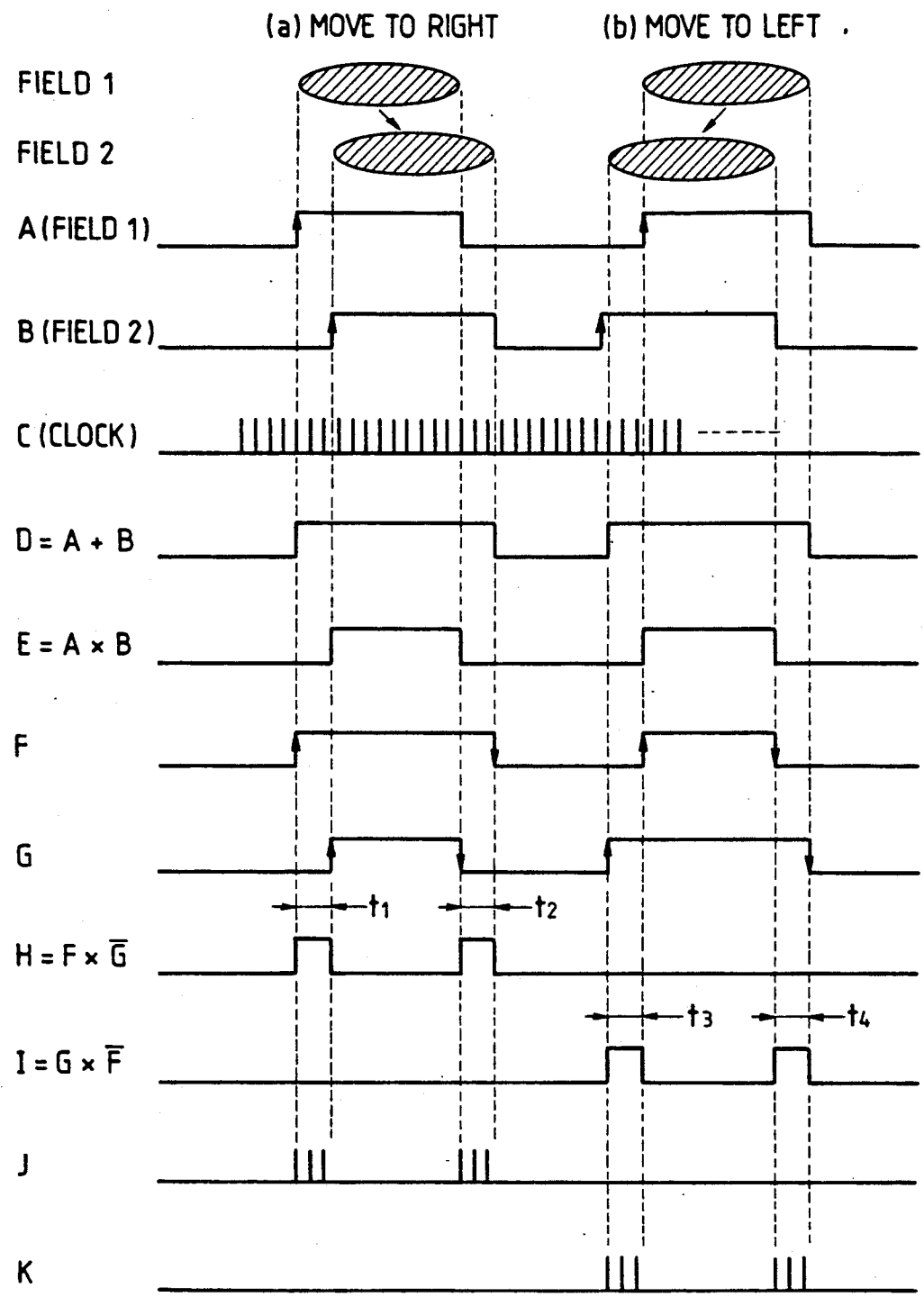
FIG. 5 is a timing chart which is drawn to explain the movements of the phase difference detection circuit 16.

It is possible to detect the movement vector precisely by comparing the phase information available from zero cross detection circuit 14 at a specified time lag ($\Delta t$) and the calculating the phase difference therefrom. The phase difference comparison circuit 16 is available to calculate this phase difference. FIG. 5 is the timing chart for the comparison of the phase difference by the phase difference circuit 16, which illustrates the phase difference, accompanied with the changes of the image at the field cycle. FIG. 5(a) shows when an object moves right and FIG. 5(b) shows when an object moves left. Clock pulse C detects the phase difference by comparing the binary image pattern A of Field 1 with the corresponding binary image pattern B of Field 2, which is caught in a time lag ($\Delta t$). The detected phase differences send an order to form the gate signal H and I, which correspond to. such phase differences respectively. By so doing, the phase difference information $t_1$, $t_2$, $t_3$ and $t_4$ are obtained. This phase difference detection method is disclosed in U.S. patent application Ser. No. 319658 filed on Mar. 6, 1989 by the assignee of this patent application.

This description shows that it is possible to detect precisely the movement vector, not affected with the conditions of lighting, by use of the binary image patterns, which are obtained by the BPF 12 and the zero cross detection circuit 14 without any influence from the changes in lighting conditions. In accordance with FIG. 5 it is possible to detect the movement vector by the two-step procedure of a uni-dimensional movement toward the X direction and then toward the Y direction. In case it is necessary to apply two-dimensional processing, the matching method shall be adopted for binary half-tone processing.

Figure 6:
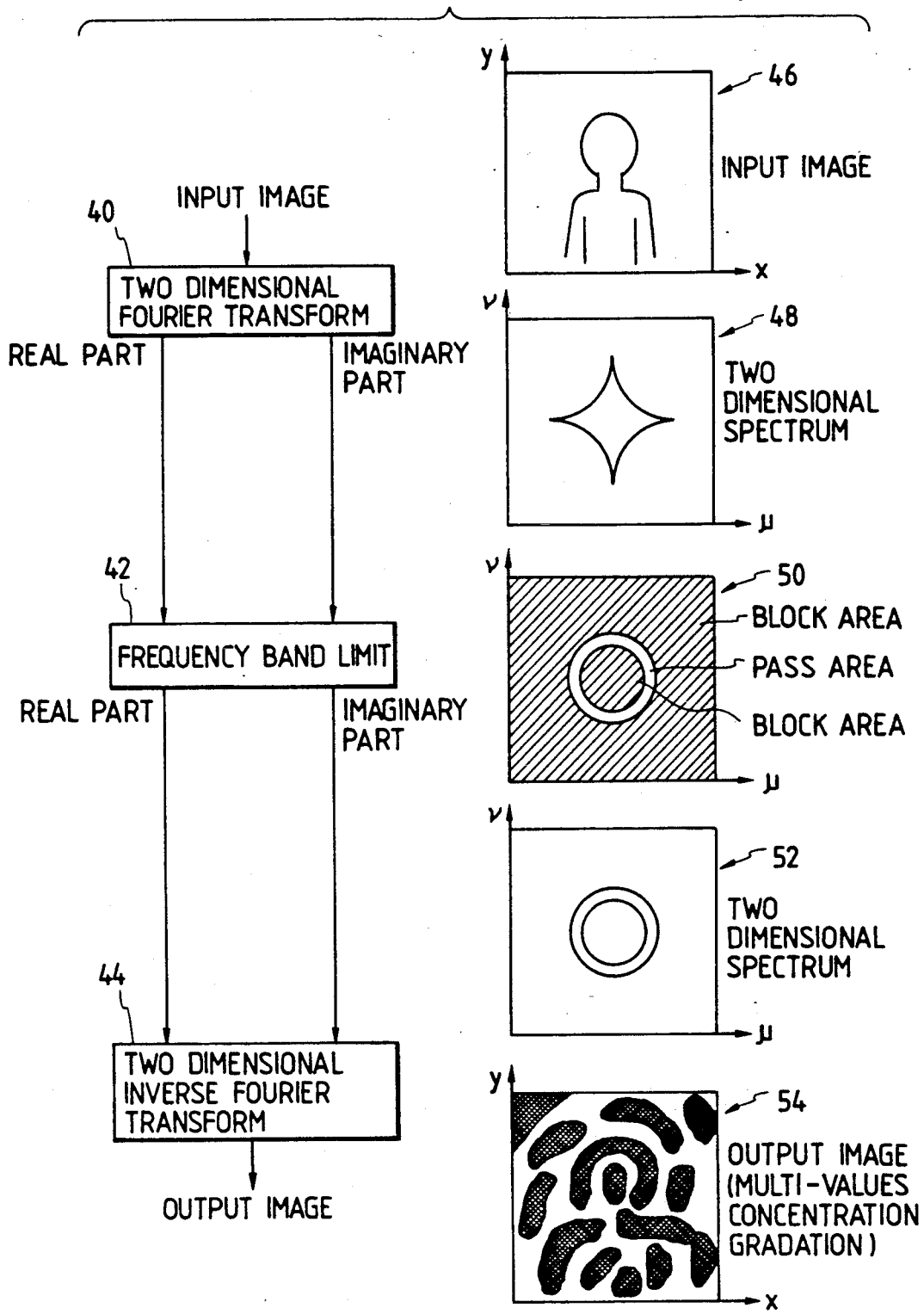
FIG. 6 is a block diagram for another embodiment of the present invention.

FIG. 6 is a block diagram for another circuit composition of a two-dimensional BPF 12. Element 40 is a two-dimensional Fourier transform circuit; Element 42 is a frequency band limit circuit, which cuts a predetermined frequency (substituted zero for the identified frequency); and Element 44 is a two-dimensional inverse Fourier transform circuit. The operations of circuits 40, 42 and 44 are materialized by a micro-computer and a digital signal processor for image processing.

For better understanding, FIG. 6 shows the exemplified data obtained in each processing stage in parallel; Element 46 is an input of the original image; Element 48 is a two-dimensional spectrum, which is obtained by a two-dimensional Fourier transform circuit 40; Element 50 is a ring-form pass area for frequency band limit circuit 42; Element 52 is a two-dimensional spectrum whose frequency band is limited by frequency band limitation circuit 42; Element 54 is output data of a two-dimensional inverse Fourier transform circuit 44.

The input image is processed into a two-dimensional Fourier transform by a two-dimensional Fourier transform circuit 40, and the data of the real part and the imaginary part, available from the two-dimensional Fourier transform circuit 40, are controlled to apply their band limitation by substituting zero for the data of the block area indicated at Element 50. The two-dimensional inverse Fourier transform circuit 44 process the data of the real part and the imaginary part, whose frequency band is limited by frequency band limitation circuit 42, into a two-dimensional inverse Fourier transform. The two-dimensional inverse Fourier transform circuit 44 provides an image pattern of multivalued density gradation. The output image is provided to the zero cross transform circuit 14, shown in FIG. 1 and the movement vector concerned is obtained in the same manner as described above.

In general, the circuit arrangements of FIG. 6 have a defect because of the time it takes to integrate using the rather time-consuming Fourier transform and inverse Fourier transform processes, but it is possible to speed up the operation by the use of specified elements and to complete it at the rate of several hundred meters per second. Consequently, the method concerned is good enough to apply to the real time processing for moving images.

As easily understood, from the above-mentioned explanation, the present invention can detect a movement vector precisely, even if the brightness of lighting changes and the image is composed of fine patterns. In addition, the present invention makes it possible to recognize the binary pattern and detect the movement vector from said pattern so that it can simplify the hardware components in comparison with the multivalued density gradation method.

Figure 7:
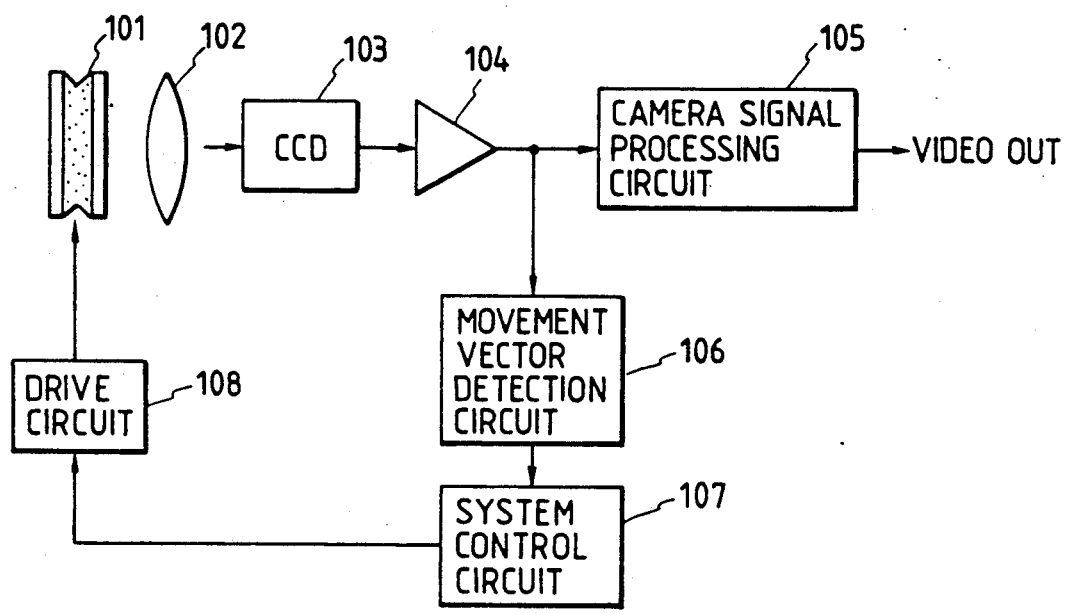
FIGS. 7 and 8 are block diagrams, showing other embodiments of an image aberration detection device using an image processing device of the present invention.
Figure 8:
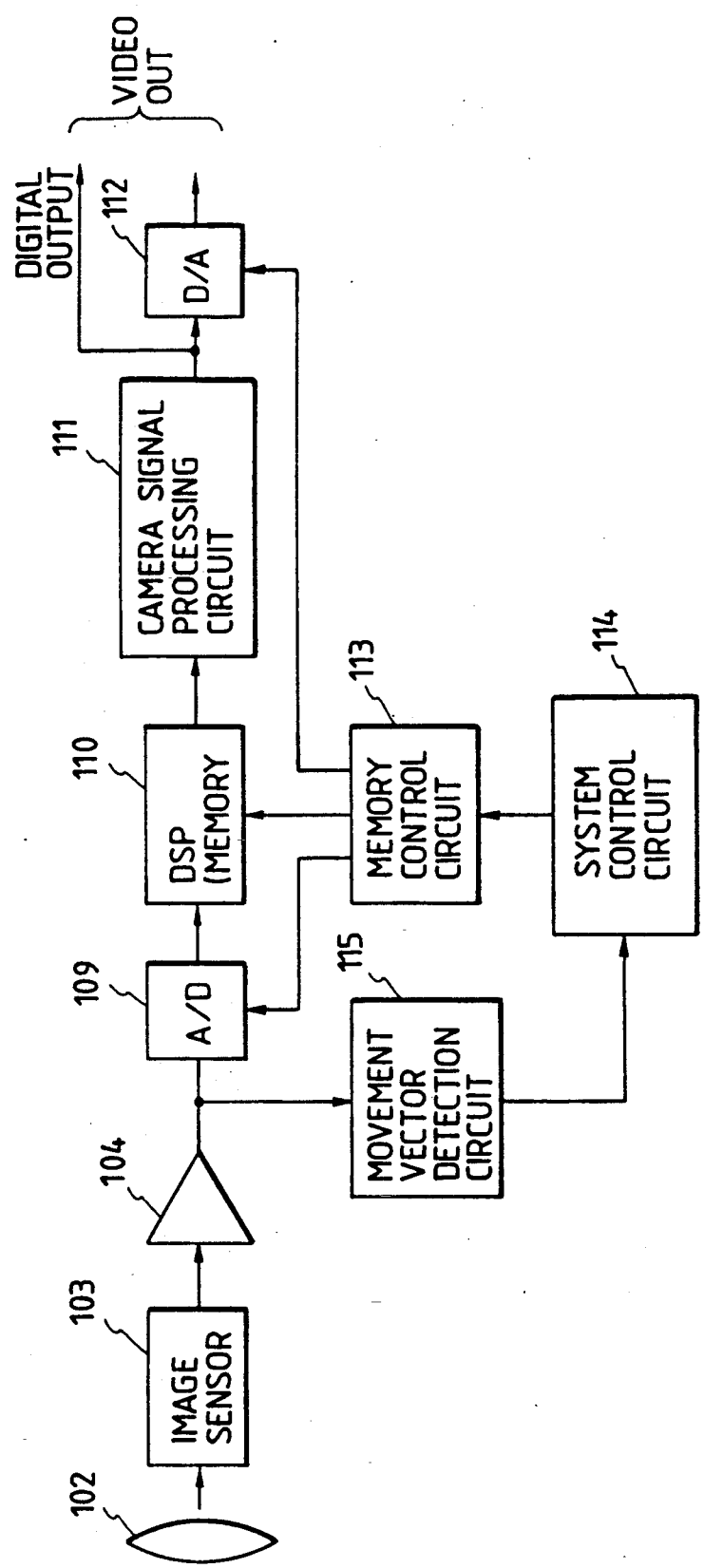

FIG. 7 and FIG. 8 show some exemplified applications in which each movement vector detection circuit is used for correcting blur in a video camera (vibration preventing device).

In FIG. 7, the optical axis of a photo lens is designed to be movable, and a variable apex angle prism is used for correcting blur optically. In the same figure, Element 101 is a variable apex angle prism in which the apex angle or optical axis of a photo lens can be varied, which prism is composed of a liquid layer of silicon compounds sandwiched between two plate glasses placed in parallel; Element 102 is a photo lens; Element 103 is a photographing element such as a CCD, which transforms optically the image of an object formed by the photo lens 102 and transmits it in the form of an image signal; Element 104 is a preamplifier; Element 105 is an image signal processing circuit, which provides the image signal transmitted by the photographing elements, with various processing treatments such as blanking, addition of signals having the same cycle, and gamma correction so that it produces an output of normalized image signal; Element 106 is a movement vector detection circuit, which consists of a two-dimensional BPF 12, zero cross detection circuit 14 and a two-dimensional phase difference detection circuit 16 as illustrated in FIG. 1; Element 107 is a system control circuit, which catches the movement vector data of an image provided by movement vector detection circuit 106, and calculates the data of the driving direction force for the variable apex angle prism to offset the movement of the image caused by camera vibration and such driving momentum required for correcting the camera vibration; Element 108 is a driving circuit, which causes the variable apex angle prism 101 to drive in accordance with the data calculated by the system control circuit 107.

Subsequently, the movement vector detection circuit 106, shown in the above-mentioned exemplified cases, detects the movement vector caused by image movement (camera vibration) and thereby the driving direction of the variable apex angle prism and its driving momentum are calculated and thus the variable apex angle prism is driven to correct the camera vibration.

The explanation of the movement of the movement vector detection circuit is omitted, since it was illustrated in the above-mentioned examples for applications.

FIG. 8 shows a mechanism which enables the correction of the movement of an image, not by optical means for the vibration adjustment, but by catching the images into a memory system and keeping the reading range from the memory movable. The elements in FIG. 8 are identical to those of FIG. 7 so that further explanation thereof is omitted.

The image signal, transmitted from the preamplifier 104, is transformed into a digital signal by an A/D transformer 109 and is tranferred into the memory of a digital signal processing circuit 110. Through this operational procedures, the memory control circuit 113 controls the rate and timing of the A/D transformer, for sending images into the meory system as well as the timing and address for writing them on the memory media. The address and the timing for reading out from the memory are also controlled by this memory control circuit 113.

The digital image signal, read out from the memory system 110, is placed under various image signal processings by the image signal processing circuit 111, transformed into an analog signal by the D/A transform circuit 112 and is output in a form of an analog image signal. It is also possible to output in the form of a digital image signal.

In the mechanism of movement vector detection circuit 115, the movement vector caused by camera vibration is detected in the manner illustrated in FIG. 1 and is transferred to the system control circuit 114 where the direction of the image movement and such moving momentum are calculated on the basis of the moving vector detected by the movement vector detection circuit 115. Thus, the memory control circuit 113 is controlled and thereby the range for reading out the memories is further controlled. In other words, the image is caught and sent to the memory system in a larger image angle than that applied for output operation, and when the memory is read out, the reading range is adjusted to correct the movement of the image. It is possible to correct the movement of the image by shifting the reading range towards the direction of movement.

For assembling the above-mentioned system, the image signal processing circuit can be placed after the D/A transformer 112 so as to adopt analog signal processing, but it is better to employ digital signal processing, because the operation itself is easier and provides a preferable noise condition.

As illustrated above, the image movements caused by vibration of the video camera can be corrected by the movement vector detection circuit, which is developed by the present invention. This invention is applicable to the detection and correction of other movements such as camera panning.

What is claimed is:

1. An image processing device, comprising:
   (a) filter means for extracting predetermined spatial frequency components from an input image signal, and
   (b) concentration normalizing means for normalizing an output of said filter means to a concentration of the image.

2. A device according to claim 1, wherein said filter means consists of a two-dimensional digital band pass filter.

3. A device according to claim 1, wherein said filter means includes two-dimensional Fourier transform circuit, frequency band limit circuit and a two-dimensional inverse Fourier transform circuit, which are constructed by micro computers and image digital signal processer.

4. A device according to claim 1, wherein said filter means is a two-dimensional band pass filter which extracts a single frequency component.

5. A device according to calim 4, wherein said concentration normalizing means is a binarizing circuit which binarizes the output from said filter means by assessing a zero level as a threshold level.

6. An image processing device, comprising:
   (a) filter means for extracting predetermined spatial frequency components from an input image signal;
   (b) binarizing means for binarizing the output of said filter means by assessing a predetermined level as a threshold level to normalize the output of said filter means to a concentration of the image;
   (c) movement detecting means for detecting movements of the image on the basis of phase changes in time of the output of said binarizing means.

7. A device according to claim 6, wherein said filter means includes two-dimensional Fourier transform circuit, frequency band limit circuit and two-dimensional inverse Fourier transform circuit which are constructed by micro computers and image digital signal processor.

8. A device according to claim 6, wherein said input image signal is a brightness signal.

9. A device according to claim 6, wherein said filter means is a two-dimensional digital band pass filter which extracts a certain uniform frequency component.

10. A device according to claim 9, wherein said binarizing means binarizes the output of said two-dimensional band pass filter by assessing a zero level as a threshold level, and outputs as binarized image signal.

11. A device according to claim 10, wherein said movement detecting means detects a movement vector of the image from a phase shift in a predetermined period of time of the binarized image signal output by said binarizing means.

12. A vibration detecting device, comprising:
   (a) image pickup means;
   (b) filter means for extracting predetermined spatial frequency components from the camera signals output from said image pickup means;
   (c) concentration normalizing means for normalizing the output of said filter means to a concentration of the image;
   (d) movement detection means for detecting a movement vector from changes of the output of said concentration normalizing means;
   (e) correction means for correcting movement amount of the images based upon the output of said movement detection means.

13. A device according to claim 12, wherein said correction means is an optical correction device which corrects the movement of the image by changing an angle of optical axis of the light incident upon said image pickup means.

14. A device according to claim 13, wherein said correction means is a variable apex angle prism.

15. A device according to claim 12, wherein said filter means is an n-dimentional digital band pass filter, whereas n is an integer.

16. A device according to claim 15, wherein said concentration normalizing means binarizes the output of said two-dimensional band pass filter by assessing a zero level as a threshold level and outputs a binarized image signal.

17. A device according to claim 16, wherein said movement detection means detects the movement vector corresponding to the movement of image, from phase changes in predetermined period of time of phase said binarized image signal.

18. A photographing device, comprising:
   (a) image pickup means;
   (b) filter means for extracting predetermined spatial frequency components from an image signal output by said image pickup means;
   (c) concentration normalizing means for normalizing the output of said filter means to a concentration of the image;
   (d) movement detection means for detecting a movement vector from changes of the output of said concentration normalizing means;
   (e) memory means for storing the image signal output by said image pickup means by A/D converting said image signal;
   (f) correction means for offsetting movement of an image by controlling a reading-out position of a stored image for said memory means, on the basis of the movement vector detected by said movement detecting means.

19. A device according to claim 18, wherein said correction means cancels the movement of the image by shifting a reading address of the memory means, towards the direction of said movement vector.

20. A device according to claim 18, wherein said correction means consists of micro-computer.

21. A device according to claim 18, wherein said filter means is an n-dimentional digital band pass filter, whereas n is an integer.

22. A device according to claim 21, wherein said concentration normalizing means binarizes the output of said two-dimensional band pass filter by assessing a zero level as a threshold level and output a binarized image signal.

23. A device according to claim 22, wherein said movement detection means detects the movement vector, corresponding to the movement of image, from phase changes in predetermined period of time of said binary-counted image signal.

24. An image processing device, comprising
   (A) image pickup means for providing an image signal;
   (B) digital filter means for extracting a signal of a predetermined frequency component from said image signal provided by said image pickup means and for normalizing said signal extracted with respect to a brightness of an object;
   (C) detection means for detecting a phase change of said signal of the predetermined frequency component extracted by said digital filter means;
   (D) movement detection means for detecting movement of an image on the basis of an output of said detection means; and
   (E) correction means for correcting the movement of the image on the basis of an output of said movement detection means.

25. An image processing device according to claim 24, wherein said correction means comprises an optical correction means.

26. An image processing device according to claim 24, further comprising a memory means for storing an output of said image pickup means, wherein said correction means controls a read-out position of image information stored in said memory means on the basis of the output of said movement detection means.

27. An image processing device according to claim 24, wherein said digital filter means divides the signal of the predetermined frequency component into two value with respect to a predetermined threshold value.

28. An image processing device according to claim 27, wherein said digital filter means comprises a two-dimensional filter.

29. An image processing device, comprising:

(A) an n-dimensional digital filter for extracting a predetermined frequency component from an image signal, wherein n is an integer;
(B) detection means for detecting a phase at which the predetermined frequency component extracted by said n-dimensional filter intersects a predetermined threshold value; and
(C) movement detection means for detecting movement of an image on the basis of a change of an output of said detection means.

30. An image processing device according to claim 29, wherein said predetermined threshold value is 0 level and said detection means detects a change of phase at which said predetermined frequency component intersects the 0 level of said predetermined threshold value.

31. An image processing device according to claim 30, further comprising correction means for correcting the movement of the image on the basis of an output of said movement detection means.

* * * * *

UNITED STATES PATENT AND TRADEMARK OFFICE
CERTIFICATE OF CORRECTION

PATENT NO. : 5,189,513

DATED : February 23, 1993

INVENTOR(S) : Masayoshi Sekine, et al.

Page 1 of 2

It is certified that error appears in the above-indentified patent and that said Letters Patent is hereby corrected as shown below:

ON THE COVER PAGE

At [56], "SIgnals," should read --Signals,--.

COLUMN 1

Line 4, "continatuion" should read --continuation--.
Line 6, "appliation of" should read --of application--.
Line 34, "case" should be deleted.
Line 39, "frequency" should read --frequency,--.
Line 50, "brightness" should read --brightness,--
Line 65, "detects" should be deleted.
Line 68, "with" should read --with a--.

COLUMN 2

Line 26, "those" should read --the--.
Line 30, "embodiments" should read --embodiment--.
Line 53, "signals," should read --signals.--.

COLUMN 3

Line 16, "signals" should read --signals,--.
Line 17, "Curve" should read --curves--.
Line 25, "pattern." should read --pattern--.
Line 62, "the" (first occurrence) should read --then--.

COLUMN 4

Line 52, "process" should read --processes--.

UNITED STATES PATENT AND TRADEMARK OFFICE
CERTIFICATE OF CORRECTION

PATENT NO.  : 5,189,513
DATED       : February 23, 1993
INVENTOR(S) : Masayoshi Sekine, et al.

It is certified that error appears in the above-indentified patent and that said Letters Patent is hereby corrected as shown below:

COLUMN 5

Line 40, "driving." should read --driving--.

COLUMN 6

Line 1, "this" should read --these--.
  Line 4, "meory" should read --memory--.
  Line 61, "processer." should read --processor.--.
  Line 65, "calim 4," should read --claim 4,--.

COLUMN 7

Line 24, "as" should read --a--.

COLUMN 8

Line 34, "comprising" should read --comprising:--.
  Line 63, "value" should read --values--.

Signed and Sealed this

Fifteenth Day of February, 1994

Attest:

BRUCE LEHMAN

Attesting Officer             Commissioner of Patents and Trademarks